US008795088B2

(12) United States Patent
Kusano et al.

(10) Patent No.: US 8,795,088 B2
(45) Date of Patent: Aug. 5, 2014

(54) VIDEO GAME SYSTEM FOR FLEXIBLY GROUPING COOPERATIVE PLAYERS

(71) Applicants: Takehiro Kusano, Tokyo (JP); Yuzo Takagi, Tokyo (JP); Keiichi Horie, Tokyo (JP); Yuuki Abe, Tokyo (JP)

(72) Inventors: Takehiro Kusano, Tokyo (JP); Yuzo Takagi, Tokyo (JP); Keiichi Horie, Tokyo (JP); Yuuki Abe, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 13/688,553

(22) Filed: Nov. 29, 2012

(65) Prior Publication Data

US 2013/0137522 A1 May 30, 2013

(30) Foreign Application Priority Data

Nov. 29, 2011 (JP) ................. 2011-260866

(51) Int. Cl.
*A63F 9/24* (2006.01)
(52) U.S. Cl.
USPC ................................. 463/42; 463/8
(58) Field of Classification Search
USPC ...................................... 463/31–42
See application file for complete search history.

(56) References Cited

U.S. PATENT DOCUMENTS

| 5,580,308 | A  | * | 12/1996 | Nakamura ........................ 463/7 |
| 6,162,120 | A  | * | 12/2000 | Takahashi et al. ................ 463/8 |
| 6,340,330 | B1 | * | 1/2002  | Oishi et al. ....................... 463/8 |
| 6,755,743 | B1 | * | 6/2004  | Yamashita et al. .............. 463/42 |
| 7,819,749 | B1 | * | 10/2010 | Fish et al. ........................ 463/42 |
| 2002/0160824 | A1 |   | 10/2002 | Goto et al. ......................... 463/9 |
| 2003/0236111 | A1 |   | 12/2003 | Otani et al. ....................... 463/8 |

FOREIGN PATENT DOCUMENTS

| JP | 2005-152455 | 6/2005 |         |
| JP | 2011-036712 | 2/2011 | ............. A63F 13/00 |
| JP | 2011-156155 | 8/2011 |         |

OTHER PUBLICATIONS

Partial European Search Report dated May 7, 2013 for European Patent Application No. 12194505.9.
Extended European Search Report dated Oct. 25, 2013 for European Patent Application No. 12194505.9.
Korean Office Action in connection with Korean Patent Application No. 10-2012-132144 issued on Jan. 14, 2014 and English translation.

* cited by examiner

*Primary Examiner* — Masud Ahmed
(74) *Attorney, Agent, or Firm* — Pillsbury Winthrop Shaw Pittman LLP

(57) ABSTRACT

In the present invention, a game system includes a game program storage unit, a group information management unit, a play history storage unit, and a group information update unit. The game program storage unit stores a game program for executing a game to be provided to a plurality of terminal devices. The group information management unit stores player identification information identifying each of a plurality of players of the game and group identification information identifying a group which includes the player, in association with each other. The play history storage unit stores a play history of each of the plurality of players for the game. The group information update unit changes an association stored in the group information management unit between player identification information identifying a first player among the plurality of players and group identification information, at least partially in accordance with the play history of the first player.

4 Claims, 7 Drawing Sheets

FIG. 3

| NAME | NUMBER OF LOGINS | NUMBER OF MONEY IN GAME | CHARGED AMOUNT | NUMBER OF BATTLES | NUMBER OF WINS | NUMBER OF LOSSES | NUMBER OF MISSIONS COMPLETED | NUMBER OF FRIENDS | NUMBER OF ITEMS POSSESSED | LV | ATTACK LEVEL | DEFENSE LEVEL | NUMBER OF COMMENTS |
|---|---|---|---|---|---|---|---|---|---|---|---|---|---|
| A | 33 | 22 | 220 | 124 | 72 | 52 | 88 | 12 | 15 | 14 | 60 | 40 | 45 |
| B | 45 | 53 | 530 | 150 | 86 | 64 | 96 | 20 | 28 | 19 | 110 | 80 | 60 |
| C | 12 | 15 | 150 | 88 | 45 | 43 | 77 | 4 | 12 | 12 | 55 | 35 | 38 |
| D | 24 | 14 | 140 | 64 | 30 | 34 | 56 | 6 | 12 | 10 | 45 | 35 | 25 |
| E | 22 | 12 | 120 | 45 | 21 | 24 | 60 | 8 | 8 | 8 | 35 | 30 | 24 |

FIG. 5A
| PLAYER NAME | PLAYER IDENTIFICATION INFORMATION | GROUP IDENTIFICATION INFORMATION |
|---|---|---|
| A | 000001 | 100001 |
| B | 000002 | 100002 |
| C | 000003 | 100003 |
FIG. 5B
| PLAYER NAME | PLAYER IDENTIFICATION INFORMATION | GROUP IDENTIFICATION INFORMATION |
|---|---|---|
| A | 000001 | 100001 |
| B | 000002 | 100001 |
| C | 000003 | 100001 |
FIG. 5C
| PLAYER NAME | PLAYER IDENTIFICATION INFORMATION | GROUP IDENTIFICATION INFORMATION |
|---|---|---|
| A | 000001 | 100001 |
| B | 000002 | 100001 |
| C | 000003 | 100004 |

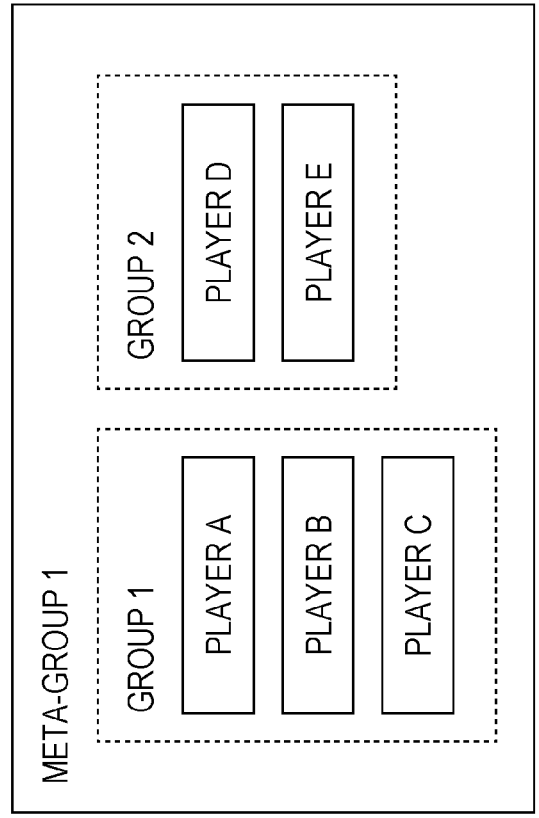
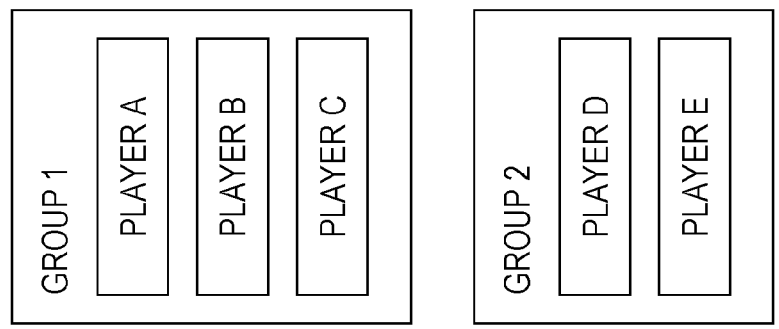

| PLAYER NAME | PLAYER IDENTIFICATION INFORMATION | GROUP IDENTIFICATION INFORMATION | META-GROUP IDENTIFICATION INFORMATION |
|---|---|---|---|
| A | 000001 | 100001 | N/A |
| B | 000002 | 100001 | N/A |
| C | 000003 | 100001 | N/A |
| D | 000004 | 100002 | N/A |
| E | 000005 | 100002 | N/A |

| PLAYER NAME | PLAYER IDENTIFICATION INFORMATION | GROUP IDENTIFICATION INFORMATION | META-GROUP IDENTIFICATION INFORMATION |
|---|---|---|---|
| A | 000001 | 100001 | 200001 |
| B | 000002 | 100001 | 200001 |
| C | 000003 | 100001 | 200001 |
| D | 000004 | 100002 | 200001 |
| E | 000005 | 100002 | 200001 |

VIDEO GAME SYSTEM FOR FLEXIBLY GROUPING COOPERATIVE PLAYERS

CROSS-REFERENCE TO RELATED APPLICATIONS

This application is based on and claims the benefit of priority from Japanese Patent Application No. 2011-260866, the contents of which are hereby incorporated by reference in its entirety

FIELD OF THE INVENTION

The present invention relates to a game system.

BACKGROUND

So-called online games are known which allow a plurality of players to share the progress of games once they access an online gaming server device via networks. Access to an online gaming server device using a terminal device allows a player of an online game to play the game in cooperation with other players. For example, a plurality of players in the same group cooperate to attempt to fulfill the mission assigned in the game or to compete against an opposing team.

There are disclosed some examples of the online game. For example, Japanese Patent Application Publication No. 2011-36712 discloses an online game in which a player is included in one of a plurality of teams and players in the same team cooperate to compete against another team.

PATENT LITERATURE

Patent Literature 1: Japanese Patent Application Publication No. 2011-36712

Existing online games have a tendency toward a fixed or rigid grouping of group members. For example, in the online game disclosed in Japanese Unexamined Patent Application Publication No. 2011-36712, once a team is formed, the members of the team are fixed until the completion of interaction with opposing teams.

Another example is disclosed in which a supervisor of a group changes a player included in the group. For example, Japanese Unexamined Patent Application Publication No. 2002-292144 discloses that a supervisor selected from among players in a group can demand withdrawal of a specific player in order to make the specific player withdraw from the group. However, the operation for making a player withdraw is complicated. In addition, a player may feel uncomfortable demanding another player to withdraw.

In this manner, existing online games are likely to provide a rigid grouping of players. Accordingly, an embodiment of the present invention provides a game system capable of dynamically changing the grouping of players in a cooperative relationship with each other in accordance with the progress of a game.

SUMMARY

In an embodiment of the present invention, a game system includes a game program storage unit, a group information management unit, a play history storage unit, and a group information update unit. The game program storage unit stores a game program for executing a game to be provided to a plurality of terminal devices. The group information management unit stores player identification information and group identification information in association with each other. The player identification information identifies each of a plurality of players of the game, and the group identification information identifies a group which includes the player. The play history storage unit stores a play history of each of the plurality of players for the game. The group information update unit changes an association stored in the group information management unit between player identification information identifying a first player among the plurality of players and group identification information identifying a group which includes the first player, at least partially in accordance with the play history of the first player.

According to an embodiment of the present invention, a game system capable of dynamically changing the grouping of players in a cooperative relationship with each other in accordance with the progress of a game may be provided.

BRIEF DESCRIPTION OF THE DRAWINGS

FIG. 3 is a diagram illustrating an example configuration of a play history information table according to the embodiment of the present invention;

FIGS. 5A to 5C illustrate an example configuration of a group identification information management table that manages the association between player identification information and group identification information according to the embodiment of the present invention;

FIGS. 6A and 6B are schematic diagrams of a combination of groups; and

DESCRIPTION OF THE PREFERRED EMBODIMENTS

Figure 1:
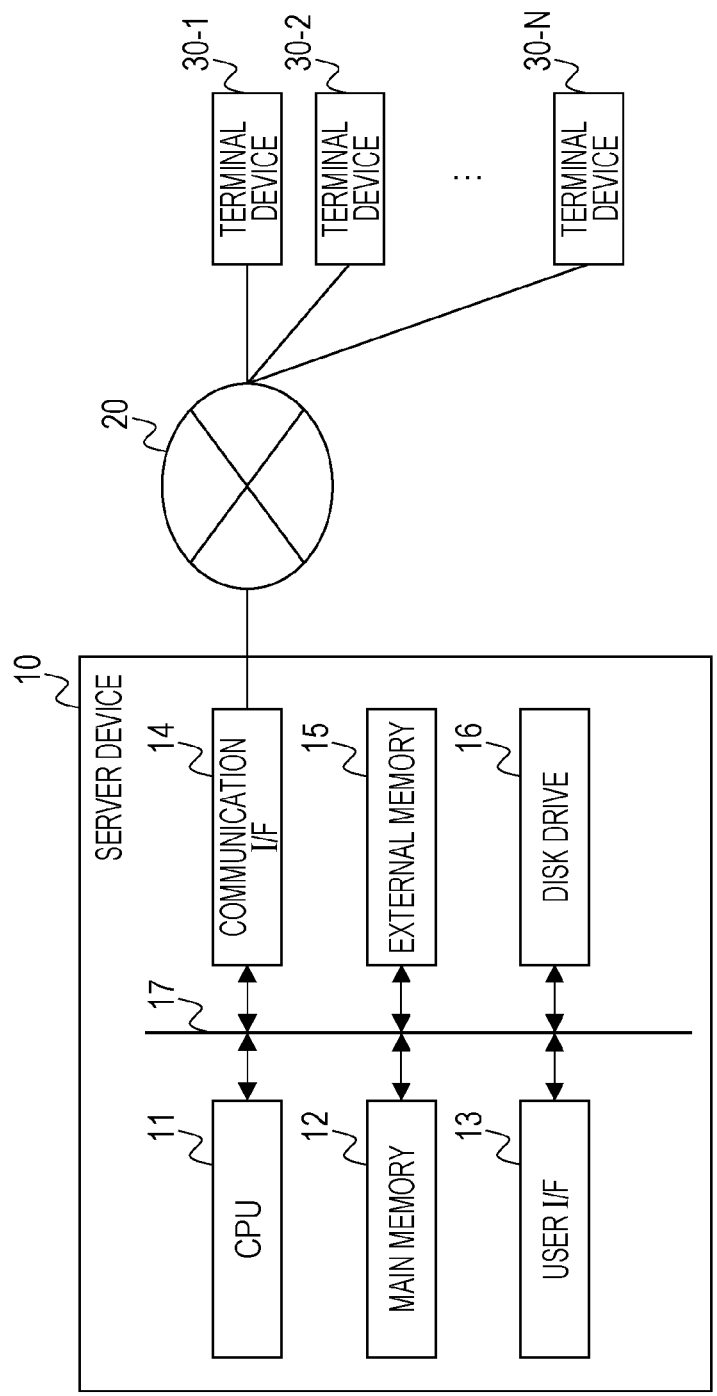
FIG. 1 is a block diagram schematically illustrating the architecture of a game system according to an embodiment of the present invention.

Some embodiments of the present invention will be described hereinafter with reference to the drawings, if necessary. FIG. 1 is a block diagram schematically illustrating the architecture of a game system according to an embodiment of the present invention. As illustrated in FIG. 1, in an embodiment of the present disclosure, an online gaming server device 10 (hereinafter also referred to simply as the "server device 10") is connected to a plurality of terminal devices 30-1, 30-2, . . . , and 30-N (hereinafter also collectively referred to as the "terminal devices 30" or each individually as the "terminal device 30"), each having a communication function, via a communication network 20 such as the Internet so that the server device 10 can communicate with the terminal devices 30.

As illustrated in FIG. 1, the server device 10 includes a central processing unit (CPU) 11, a main memory 12, a user interface (I/F) 13, a communication I/F 14, an external memory 15, and a disk drive 16, and these components are electrically connected to one another via a bus 17. The CPU 11 loads an operating system and various programs for controlling the progress of an online game into the main memory 12 from the external memory 15, and executes commands included in the loaded programs. The main memory 12 is used to store a program to be executed by the CPU 11, and is formed of, for example, a dynamic random access memory (DRAM).

The user I/F 13 includes, for example, an information input device including a keyboard, a mouse, and the like through which an operator enters an input, and an information output device including a liquid crystal display and the like through which calculation results of the CPU 11 are output. The communication I/F 14 is implemented as hardware, firmware, or communication software such as a transmission control protocol/Internet protocol (TCP/IP) driver or a point-to-point protocol (PPP) driver, or a combination thereof, and is configured to be able to communicate with the terminal devices 30 via the communication network 20.

The external memory 15 is formed of, for example, a magnetic disk drive, and stores various programs such as a game program for allowing the terminal device 30 to execute an online game and a control program for controlling the progress of the online game. The game program is created using, for example, Adobe Flash (registered trademark), which is a format developed by Adobe Systems Incorporated to handle moving images, games, and the like. The game program created using Adobe Flash (registered trademark) is stored in the external memory 15 as a small web format (SWF) file. The game program will be described below. The disk drive 16 reads data stored in a storage medium such as a compact disc read only memory (CD-ROM), digital versatile disc read only memory (DVD-ROM), or DVD Recordable (DVD-R) disc, or writes data to such a storage medium. For example, data of a game program or the like stored in a storage medium is read by the disk drive 16, and is installed into the external memory 15.

The terminal device 30 may be any information processing device capable of executing a game program in the server device 10, such as a mobile phone, a smartphone, a game console, a personal computer, a tablet, or an electronic book reader. The terminal device 30 has, for example, browser software for interpreting a hypertext markup language (HTML) file and displaying a screen, and plug-in software (e.g., Flash Player distributed by Adobe Systems Incorporated) incorporated in the browser software. The terminal device 30 acquires an SWF file embedded in an HTML file from the server device 10, and executes the SWF file using the browser software and plug-in software, and therefore the user of the terminal device 30, or a game player, may be provided with a gaming function.

The game program is stored in the server device 10 in various forms. For example, the game program may be provided as a piece of application software executable on various application execution platforms. The player is able to execute or operate a game application using the terminal device 30.

Figure 2:
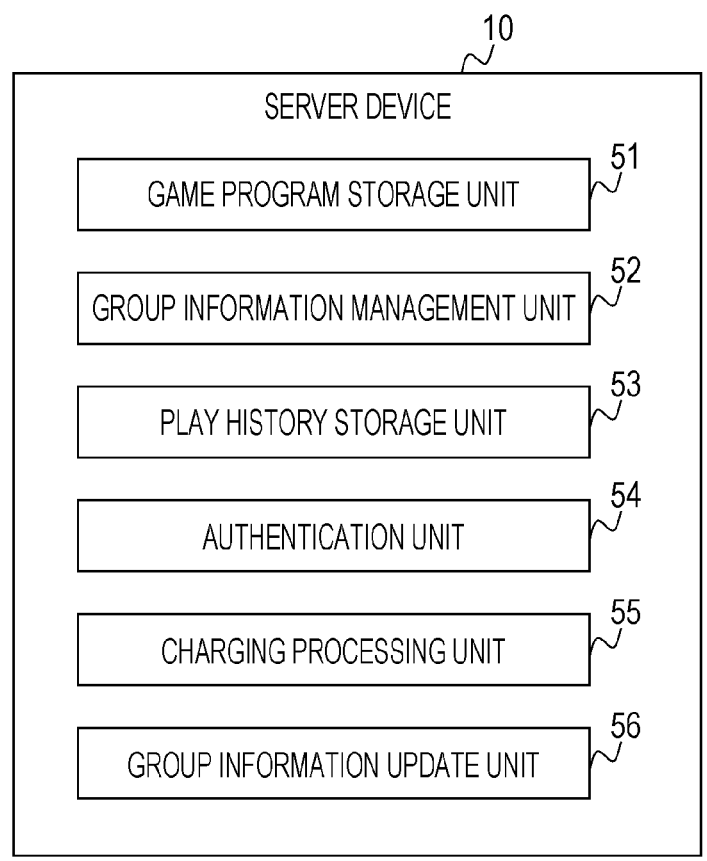
FIG. 2 is a block diagram schematically illustrating the functionality of the game system according to the embodiment of the present invention.

FIG. 2 is a block diagram illustrating the functionality of the server device 10. The functionality of the server device 10 illustrated in FIG. 2 is implemented by components of the server device 10 illustrated in FIG. 1. As illustrated in FIG. 2, the server device 10 may include a game program storage unit 51, a group information management unit 52, a play history storage unit 53, an authentication unit 54, a charging processing unit 55, and a group information update unit 56.

The game program storage unit 51 stores game programs for executing or operating various games executable or operable on the terminal device 30. The game programs may be created using, for example, script languages such as ActionScript and JavaScript, both of which are registered trademarks, or object-oriented programming languages such as Objective-C and Java, both of which are registered trademarks. The game programs are executed or operated on a platform installed on the terminal device 30. A game program to be stored in the game program storage unit 51 may be produced by modifying a web page created in a markup language such as HTML5 by using a style sheet such as Cascading Style Sheet 3 (CSS3). Such a web page created in a markup language is executed or operated by the browser software installed on the terminal device 30. The game program storage unit 51 may store a desired number of game programs, and a game program for executing or operating a game selected by the terminal device 30 is provided to a desired number of terminal devices 30 via the communication I/F 14 in accordance with control of the CPU 11.

The terminal device 30 may execute or operate the game program to play various games such as action games, role-playing games, baseball interactive games, and card games. The games implemented by the game program are not limited to those explicitly disclosed herein. When a game is executed, for example, animation or an operation icon designated by the program is displayed on a screen of the terminal device 30. The player may enter an instruction for causing the game to progress using an input interface (e.g., a touch screen or a button) of the terminal device 30. The instruction entered by the player is transmitted to the server device 10 through the browser of the terminal device 30 or a platform function such as NgCore (registered trademark). The terminal device 30 sends information indicating various parameters (such as the number of game points earned and information concerning obtained items), which is used in the game, and information indicating the status of the game (such as information specifying which mission has been fulfilled) to the server device 10, if necessary. The game program storage unit 51 manages the progress of the individual players in the game in accordance with information received from the plurality of terminal devices 30, such as instructions, information indicating the parameters, and information indicating the statuses. Thus, each player is able to resume the interrupted game from the point where it was interrupted, on the basis of the information concerning the progress of the game held in the server device 10.

The group information management unit 52 divides, for each game program stored in the game program storage unit 51 (namely, each game), players registered in the game into a plurality of groups, and manages the associations between the players and the groups in accordance with the grouping of players in each group. For example, when one of the games implemented by the game program in the game program storage unit 51 is executed on the terminal device 30 for the first time, the user of the terminal device 30 may be registered as a player of the game, and the registered player may be included in one or a plurality of groups. Specifically, the group information management unit 52 may assign player identification information to a player who is registered as a player of a specific game in accordance with a predetermined rule, and store the player identification information in association with group identification information identifying a group in which the player is included.

In a specific game, players in the same group may cooperate to progress in the game. For example, in a game (e.g., a role-playing game) designed such that players progress in the game by defeating enemy characters, players in the same group may cooperate to attempt to battle against an enemy character. In an interactive game, players in the same group may cooperate to compete against an opposing group. The algorithm for determining victory or defeat with an enemy character may be defined in such a manner that, for example, parameters indicating the attributes of each player in a group who attempts to battle against the enemy character (which may be represented in various ways such as attack, defense, life, and stamina levels) are compared with parameters of the same type for the enemy character and the winning percentage of the player is higher than that of the enemy character when the attributes of the player are superior to those of the enemy character. In a case where a plurality of players in a group cooperate to compete against an enemy character, the determination of victory or defeat may be performed by, for example, comparing the sum of parameters representing the attributes of all the players in the group with the parameter representing the corresponding attribute of the enemy character.

The play history storage unit 53 may manage a play history of a player specified by the player identification information stored in the group information management unit 52 on a game-by-game basis. The play history storage unit 53 may store the play history in a play history information table in the external memory 15. Examples of the play history include the number of logins made by the player to play the game, the total number of game points the player has earned in the game, the amount of money the user has spent on purchasing game items (i.e., the amount charged to the user), and the number of messages the user has sent to other users. FIG. 3 illustrates an example of the play history information table. The play history is not limited to that explicitly disclosed herein or illustrated in FIG. 3, and may include arbitrary information concerning the activity of a specific player in a specific game (the degree to which the player is active in the game). The play history may be managed every predetermined period. For example, the number of logins made by a specific user may be managed at predetermined intervals such as daily, weekly, or monthly. The play history will be described in more detail below.

Upon access from the terminal device 30 to the server device 10 to play a specific game on the terminal device 30, the authentication unit 54 authenticates the player who has made the access request. The access request may be automatically sent to the server device 10, for example, when application software for the game is started on the terminal device 30. If the game program is embedded in an HTML file and is provided, authentication processing may be performed in response to a request for obtaining the HTML file. The access request includes, for example, identification information or a password for identifying the player. The authentication unit 54 checks the authentication information and/or password included in the access request against authentication information and/or password registered in advance to authenticate the player. If authentication succeeds, the player is authorized to log in the game to play the game. The play history storage unit 53 may manage the number of times access was granted by the authentication unit 54, as the number of logins which is an item of the play history.

The charging processing unit 55 determines the amount charged to the player, and manages the determined charged amount. For example, the charging processing unit 55 may receive a purchase request for so-called virtual items, such as virtual weapons and armor, from a player, and determine the amount charged to the player in accordance with the purchase request. The charging processing unit 55 may also charge a user for any service request given by the user as well as for the purchase of virtual items. The play history storage unit 53 may manage the charged amount determined by the charging processing unit 55 as an item of the play history.

The group information update unit 56 may change the association between player identification information and group identification information in the group information management unit 52 at least partially in accordance with the play history managed by the play history storage unit 53. The group information update unit 56 may change an association between player identification information and group identification information on a specific player by, for example, making the specific player withdraw from a specific group, making the specific player join a specific group, ceasing the membership of the specific player in the specific group for a predetermined period of time, or limiting the involvement of the specific player in the progress of the game.

In an exemplary embodiment, the group information update unit 56 may refer to the play history in the play history storage unit 53, specify a non-active player having a low activity in a specific game, exclude the non-active player from the current group in which the non-active player is currently included, and associate the player identification information on the non-active player with group identification information on other groups. For example, group identification information on a group including only the non-active player as a constituent member is newly created, and player identification information on the non-active player is associated with the group identification information. In an embodiment, a non-active player is a player whose membership in the current group ceases for a predetermined period of time. For example, if the current group has a vacant position after the predetermined period of time has elapsed (or if the number of members included in the group has not reached the upper limit), the non-active player may be returned to the group.

The group information update unit 56 may determine that, for example, a player who logs in three times or less for a predetermined period of time (e.g., one week) is a non-active user. In another embodiment, the group information update unit 56 may determine that a player who is not charged for a predetermined period (e.g., one month) is a non-active player.

In another exemplary embodiment, the group information update unit 56 may specify an active player having a high activity and preferentially keep the active player in the current group while excluding a player having a relatively low activity from the current group. For example, players may be kept in the current group preferentially in order from the player who has logged in the largest number of times for the predetermined period, and a player who has logged in a relatively small number of times may be excluded. Further, a player who has logged in a larger number of times than the excluded player among players included in any other group or among players who are not included in any groups may be joined in the current group. Similarly, a player charged a large amount may be preferentially kept in the current group, and a player charged a relatively small amount may be excluded from the current group. Accordingly, a player who is more active in the play may be left in the current group. This may encourage individual players to be more active in the game.

In still another exemplary embodiment, for example, the group information update unit 56 may specify an active player having a high activity in a game on the basis of one or more criteria. Examples of the criteria include the amount of money the player has in the game, the number of battles fought by the player in the game (the number of wins, the number of losses), the number of times a mission in the game has been completed by the player, the number of friends of the player in the game, the number of items the player possesses in the game, the level of the player, attack and/or defense level, and the number of comments posted by the player in the game. The parameters given above may be stored in the play history storage unit 53 as items of the play history. In this manner, a player having a high activity in a game may be preferentially kept in the current group under control of the group information update unit 56. Conversely, a player having a relatively low activity in the game may be excluded from the current group. Accordingly, the degree to which a player is active is evaluated in terms of the content of the play of the game rather than in terms of utilization of the game system, such as the number of logins and the charged amount. A player having a high activity in the game may be kept in the current group. Accordingly, a player who is more active in a game may be left in the current group. This may encourage individual players to be more active in the game even after the game is initiated, rather than to merely participate in the game.

Figure 4A:
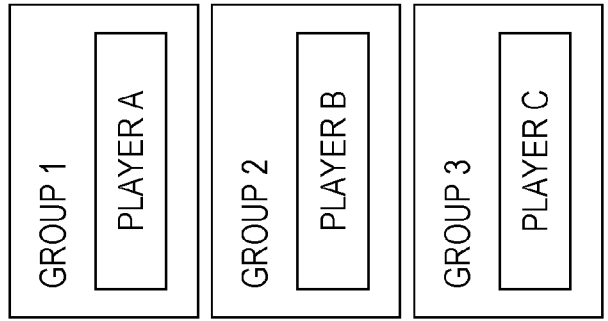
FIGS. 4A to 4C are schematic diagrams illustrating a change of the association between player identification information and group identification information.
Figure 4B:
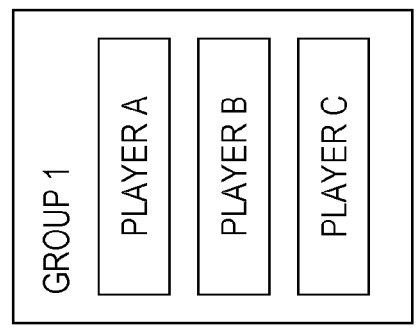
Figure 4C:
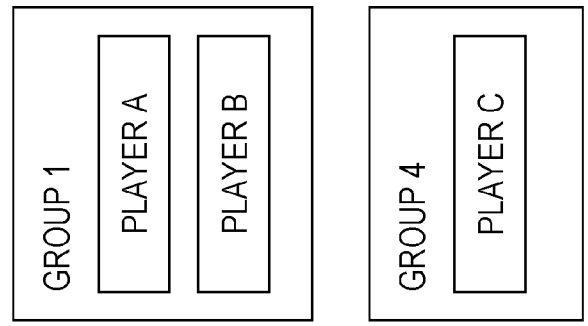

The change of an association between player identification information and group identification information by the group information update unit 56 will be described with reference to FIGS. 4A to 4C and 5A to 5C. FIGS. 4A to 4C are schematic diagrams illustrating the change of an association between player identification information and group identification information according to an embodiment of the present disclosure. FIGS. 5A to 5C illustrate an example configuration of a group identification information management table that manages an association between player identification information and group identification information. The group identification information management table is stored in, for example, the external memory 15. As illustrated in FIG. 4A, in an exemplary embodiment, players A, B, and C are initially included in groups 1, 2, and 3, respectively, as the sole constituent members immediately after a predetermined game program has been downloaded for the first time. In this case, as illustrated in FIG. 5A, the group information management unit 52 stores player identification information "000001" identifying the player A in association with group identification information "100001" identifying the group 1, player identification information "000002" identifying the player B in association with group identification information "100002" identifying the group 2, and player identification information "000003" identifying the player C in association with group identification information "100003" identifying the group 3.

Then, as illustrated in FIG. 4B, for example, the player A invites the player B and the player C to the group 1. The player B and the player C accept the invitation, so that the player B and the player C in addition to the player A can be included in the group 1 as constituent members. In order to reflect the change in the grouping of the group, as illustrated in FIG. 5B, the group information management unit 52 stores the three pieces of player identification information respectively identifying the players A, B, and C in association with the group identification information "100001" identifying the group 1. The re-grouping described above may be automatically performed using a matching module (not illustrated) in the server device 10. The matching module may be configured to match players against each other in accordance with a predetermined algorithm based on, for example, various attributes of the players (e.g., level, sex, age, etc.).

The group information update unit 56 may periodically monitor the play history of players, and specify a non-active player. For example, if it is determined that the player C is a non-active player, as illustrated in FIG. 4C, the player C may be excluded from the group 1. In this case, as illustrated in FIG. 5C, the group information update unit 56 stores the group identification information identifying the group 1 in association with the pieces of player identification information respectively identifying the player A and the player B, and stores the player identification information on the player C in association with group identification information "100004" identifying a group 4 different from the group 1. Accordingly, the player C is excluded from the group 1. Thereafter, the player A may invite another player (e.g., a player D (not illustrated)) to the group 1.

As described above, according to an embodiment of the present disclosure, a non-active player who is not active in a game may be excluded from the group in which the non-active player is currently included, in accordance with the play history of each individual player stored in the play history storage unit 53. In particular, a player with a small number of accesses to the game or with a low frequency of purchase of virtual items may be specified as a non-active player. If there is an upper limit set for the number of players included in a group, the position that is vacant because the non-active player has been excluded may be filled with a new player, and the new player may cooperate with the other players to progress in the game. An online gaming server device according to an embodiment of the present disclosure may change the grouping of players included in a group in accordance with the states of the play of the players, thereby dynamically changing the grouping of players in a cooperative relationship with each other in accordance with the progress of a game.

Figures 7A, 7B:
FIGS. 7A and 7B illustrate an example configuration of a meta-group identification information management table that manages player identification information, group identification information, and meta-group identification information according to another embodiment of the present invention.

Next, an example in which a plurality of groups are combined to create a new group will be described with reference to FIGS. 6A, 6B, 7A, and 7B. A more extensive set of players, which is created by combining a plurality of groups, is herein sometimes referred to as meta-group, and information identifying the meta-group is herein sometimes referred to as meta-group identification information. FIGS. 6A and 6B are schematic diagrams of a combination of groups, and FIGS. 7A and 7B illustrate an example configuration of a meta-group identification information management table that manages player identification information, group identification information, and meta-group identification information. The meta-group identification information management table is stored in, for example, the external memory 15. As illustrated in FIG. 6A, three players, namely, players A, B, and C, are included in a group 1, and two players, namely, players D and E, are included in a group 2. As illustrated in FIG. 7A, the group information management unit 52 stores group identification information on the groups 1 and 2 in association with player identification information on each of the players included in each group.

In an embodiment, the group 1 and the group 2 may be combined. For example, as illustrated in FIG. 6B, the group 1 and the group 2 may be combined to generate meta-group 1 including all the players included in the group 1 and all the players included in the group 2. Thus, all the players included in the meta-group 1 may cooperate to progress in the game. For instance, all the players included in the meta-group may battle against an enemy character using the sum of parameters of all the players.

When the meta-group 1 is to be generated, as illustrated in FIG. 7B, the group information management unit 52 may store meta-group identification information "200001" identifying the meta-group 1 in association with player identification information on each of the players included in the meta-group 1 under control of, for example, a meta-group identification information generation unit (not illustrated). In this case, the players included in the meta-group 1 are included in the original groups in which the individual players are initially included, and are also included in a meta-group including the original groups. For example, after the group 1 and the group 2 are combined into the meta-group 1, the player A is included in the group 1 and is also included in the meta-group 1. The player identification information identifying the player A is stored in the group information management unit 52 in association with both the group identification information identifying the group 1 and the meta-group identification information identifying the meta-group 1.

The meta-group identification information generation unit may periodically refer to the play history of members constituting each group to determine the total activity of the group in accordance with the play history of the members, and specify an active group and a non-active group. For example, it is determined whether each group is an active group or a non-active group, based on the sum of the numbers of logins made by the respective members constituting the group or the sum of the charged amounts determined by the charging processing unit 55. For example, in FIG. 6A, it may be determined that the group 1 is an active group and the group 2 is a non-active group. In this case, as illustrated in FIG. 6B, the group 1 and the group 2 may be formed into the single meta-group 1. In this way, in the progress of a game, an active group and a non-active group may be combined so that a group having a high activity leads a group having a low activity to progress in the game. In another embodiment, active groups may be combined to generate a meta-group or non-active groups may be combined to generate a meta-group.

Two groups may be combined automatically (without the operation of the player) when a predetermined condition is satisfied (such as when the game has proceeded to a predetermined stage or when a predetermined period of time has elapsed since the game was initiated). In addition, two groups may be combined by the following procedure: A player included in one group (e.g., the player A in the group 1) asks at least one of players included in another group (e.g., the players D and E in the group 2) if both groups are combined. If the asked player agrees, the two groups are combined. The number of groups to be combined is not limited to two, and, for example, more than two groups may be combined.

As described above, individual players included in the meta-group 1 are included in the original groups in which the individual players are initially included, and are also included in a meta-group including the original groups. Thus, as in the embodiment described with reference to FIG. 3, a non-active player who is not active in the game among the players included in the meta-group 1 may be excluded from the group in which the non-active player is included, in accordance with the play history of the individual players stored in the play history storage unit 53. As described above, a player with a small number of accesses to the game or with a low frequency of purchase of virtual items may be specified as a non-active player. Thus, if there is an upper limit set for the number of players included in a group, the position that is vacant because the non-active player has been excluded may be filled with a new player, and the new player may cooperate with the other players to progress in the game.

In an embodiment, a group selected from one or a plurality of groups constituting a meta-group may be excluded from the meta-group. For example, in a meta-group including two active groups, a less active group having a larger number of players who are not active in the game may be excluded from this meta-group. The less active group including a larger number of players with a small number of accesses to the game or with a low frequency of purchase of virtual items may particularly be specified as a non-active group. Thus, if there is an upper limit set for the number of members of a meta-group, the position that is vacant because the non-active group has been excluded may be filled with a new group, and the new group may cooperate with the other groups to progress in the game.

Accordingly, in an embodiment of the present disclosure, groups may be combined to generate a meta-group, and thus the players included in the meta-group may cooperate to progress in a game. Therefore, in an embodiment of the present disclosure, groups may be combined to dynamically change the grouping of players in a cooperative relationship with each other in accordance with the progress of a game.

The processes and procedures described and illustrated herein are implemented by software, hardware, or any combination thereof, as well as that explicitly stated in the embodiments. More specifically, the processes and procedures described and illustrated herein are implemented by the installation of the logic corresponding to the processes into a medium such as an integrated circuit, a volatile memory, a non-volatile memory, a magnetic disk, or an optical storage. The processes and procedures described and illustrated herein may also be installed in the form of a computer program, and executed by various computers.

If the processes and procedures has been described and illustrated herein to be executed by a single device, software, component, or module, such processes or procedures may also be executed by a plurality of devices, a plurality of pieces of software, a plurality of components, and/or a plurality of modules. The data, table, or database described and illustrated herein to be stored in a single memory may also be distributed to and stored in a plurality of memories included in a single device or a plurality of memories which are located in a plurality of devices in a distributed manner. Furthermore, the software and hardware elements described and illustrated herein may also be integrated into a smaller number of constituent elements or separated into a larger number of constituent elements.

What is claimed is:

1. A game system comprising:
    a game program storage unit that stores a game program for executing a game to be provided to a plurality of terminal devices;
    a group information management unit that stores player identification information and group identification information in association with each other, a player of the game being included in one of a plurality of groups, the player identification information identifying the player, the group identification information identifying the group which includes the player; and
    a meta-group information generation unit that generates a first meta-group by combining a first group and a second group among the plurality of groups, and that stores player identification information identifying each of players included in the first group and the second group in association with meta-group identification information identifying the first meta-group.

2. The game system of claim 1, wherein the meta-group information generation unit is configured to identify the first group based on a first play history of each of said players included in the first group and to identify the second group based on a second play history of each of said players included in the second group.

3. The game system of claim 2, wherein the meta-group information generation unit is configured to combine the first group and the second group when the first group is specified as an active group based on the first play history and the second group is specified as a non-active group based on the second play history.

4. The game system of claim 3, wherein the first play history includes the number of logins to the game by the players included in the first group and/or the amount of money spent by the players included in the first group on purchasing game items; and wherein the second play history includes the number of logins to the game by the players included in the second group and/or the amount of money spent by the players included in the second group on purchasing game items.

* * * * *